(12) United States Patent
Xu et al.

(10) Patent No.: US 11,090,991 B2
(45) Date of Patent: Aug. 17, 2021

(54) HUMAN MACHINE INTERFACE FOR VEHICLE ALIGNMENT IN AN ACCEPTABLE HITCH ZONE

(71) Applicant: Ford Global Technologies, LLC, Dearborn, MI (US)

(72) Inventors: Li Xu, Northville, MI (US); Roger Arnold Trombley, Ann Arbor, MI (US); Luke Niewiadomski, Dearborn, MI (US); Kyle Simmons, New Boston, MI (US); Kenneth Michael Mayer, Ypsilanti, MI (US); Shannon Brooks-Lehnert, Ann Arbor, MI (US); Seyed Armin Raeis Hosseiny, Canton, MI (US); Bo Bao, Canton, MI (US); Katherine Rouen, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 16/208,777

(22) Filed: Dec. 4, 2018

(65) Prior Publication Data

US 2020/0171897 A1 Jun. 4, 2020

(51) Int. Cl.
*B60D 1/36* (2006.01)
*B62D 15/02* (2006.01)
*B62D 13/00* (2006.01)

(52) U.S. Cl.
CPC ............... *B60D 1/36* (2013.01); *B62D 13/00* (2013.01); *B62D 15/025* (2013.01); *B62D 15/029* (2013.01)

(58) Field of Classification Search
CPC ........ B60D 1/36; B62D 13/00; B62D 15/025; B62D 15/029
See application file for complete search history.

(56) References Cited

U.S. PATENT DOCUMENTS

| 9,696,723 | B2 * | 7/2017 | Zeng | G05D 1/0212 |
|---|---|---|---|---|
| 2012/0283909 | A1 * | 11/2012 | Dix | G05D 1/0278 701/41 |
| 2014/0058614 | A1 * | 2/2014 | Trombley | B62D 15/027 701/29.1 |
| 2014/0058655 | A1 * | 2/2014 | Trombley | B62D 15/027 701/300 |
| 2014/0058668 | A1 * | 2/2014 | Trombley | B62D 13/06 701/523 |
| 2014/0267688 | A1 * | 9/2014 | Aich | B60W 50/0097 348/113 |
| 2014/0297128 | A1 * | 10/2014 | Lavoie | B60W 30/045 701/41 |

(Continued)

FOREIGN PATENT DOCUMENTS

EP 2682329 A1 1/2014

*Primary Examiner* — Peter D Nolan
*Assistant Examiner* — Wae L Louie
(74) *Attorney, Agent, or Firm* — Raymond Coppiellie Price Heneveld LLP

(57) ABSTRACT

A vehicle hitching assistance system includes a controller identifying a trailer coupler within a specified area relative to the vehicle. The specified area is defined between a maximum distance and a minimum distance from a rear of the vehicle and within left and right lateral vehicle control limits. The controller also outputs a steering signal to the vehicle to cause the vehicle to steer to align a hitch ball of the vehicle with the coupler.

20 Claims, 14 Drawing Sheets

(56) References Cited

U.S. PATENT DOCUMENTS

| | | | |
|---|---|---|---|
| 2015/0115571 A1* | 4/2015 | Zhang | H04N 7/183 |
| | | | 280/477 |
| 2015/0203156 A1* | 7/2015 | Hafner | B62D 15/027 |
| | | | 701/36 |
| 2016/0052548 A1* | 2/2016 | Singh | B60D 1/36 |
| | | | 701/37 |
| 2020/0039306 A1* | 2/2020 | Rogan | B60D 1/36 |
| 2020/0070887 A1* | 3/2020 | Niewiadomski | B60D 1/62 |
| 2020/0073398 A1* | 3/2020 | Niewiadomski | B60D 1/36 |
| 2020/0079165 A1* | 3/2020 | Niewiadomski | G06K 9/00791 |
| 2020/0086702 A1* | 3/2020 | Ling | B60D 1/62 |
| 2020/0097021 A1* | 3/2020 | Carpenter | B60D 1/06 |
| 2020/0101897 A1* | 4/2020 | Miller | B60Q 9/008 |
| 2020/0130582 A1* | 4/2020 | Wong | B62D 15/0285 |
| 2020/0130744 A1* | 4/2020 | Niewiadomski | B60D 1/62 |
| 2020/0148018 A1* | 5/2020 | Lavoie | G05D 1/0225 |
| 2020/0148257 A1* | 5/2020 | Niewiadomski | B62D 15/0295 |
| 2020/0148258 A1* | 5/2020 | Mayer | B62D 15/025 |
| 2020/0156425 A1* | 5/2020 | Xu | B60R 11/04 |
| 2020/0164919 A1* | 5/2020 | Cotter | B62D 15/025 |

* cited by examiner

HUMAN MACHINE INTERFACE FOR VEHICLE ALIGNMENT IN AN ACCEPTABLE HITCH ZONE

FIELD OF THE INVENTION

The present invention generally relates to a vehicle hitch assistance system. In particular, the system provides the user with various options for assisting in hitching a vehicle with a trailer and targets for initial alignment of the vehicle prior to assistance in hitching.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE INVENTION

According to one aspect of the present invention, a vehicle hitching assistance system includes a controller identifying a trailer coupler within a specified area relative to the vehicle. The specified area is defined between a maximum distance and a minimum distance from a rear of the vehicle and within left and right lateral vehicle control limits. The controller also outputs a steering signal to the vehicle to cause the vehicle to steer to align a hitch ball of the vehicle with the coupler.

Embodiments of the first aspect of the invention can include any one or a combination of the following features:
the specified area is to a rear of the vehicle, and the left and right lateral vehicle control limits are equal to left and right steering path limits of the vehicle;
the left and right lateral vehicle control limits are less than left and right steering path limits of the vehicle and are defined by one of a predetermined proportion or a predetermined steering angle;
the left and right lateral vehicle control limits are less than left and right steering path limits of the vehicle and are defined by two straight inner left and right paths that extend from the hitch ball at a predetermined angle to each other;
the system further includes an imaging system mounted with and directed toward the rear of the vehicle, the controller further acquires image data from the vehicle, and the specified area is identified within the image data and is less than a total field of the image data;
the controller first identifies a trailer within the specified area and then identifies the coupler as associated with the trailer;
the maximum distance and minimum distance correspond with limits of controller in identifying the trailer coupler within the image data;
the maximum distance and minimum distance are further based on a resolution of the image data and a proportion of the trailer relative to the total field, respectively;
the left and right lateral vehicle control limits are selected to maintain a swingout distance of the vehicle in steering to align the hitch ball of the vehicle with the coupler to less than a predetermined value;
the left and right lateral vehicle control limits are defined by a path of the hitch ball for the vehicle reversing at a maximum steering angle selected based on a wheelbase of the vehicle to maintain the swingout distance of the vehicle in steering to align the hitch ball of the vehicle with the coupler to less than the predetermined value;
a maximum distance and the minimum distance from the rear of the vehicle are measured radially from the hitch ball of the vehicle;
the controller outputs the steering signal to a steering system included with the vehicle, and the controller derives the steering signal based on at least a maximum steering angle of the steering system; and
the controller further outputs a video image displayable on a human-machine interface within the vehicle including an image to the rear of the vehicle and a graphic overlay of the specified area on the image data in a proportionally correlated manner between the image data and an assumed ground plane on which the vehicle is positioned.

According to another aspect of the present invention, a vehicle includes a hitch ball mounted on a rear of the vehicle, a steering system, and a controller. The controller identifies a trailer coupler within a specified area defined between a maximum distance and a minimum distance from the rear of the vehicle and within left and right lateral vehicle control limits and outputs a steering signal to the steering system to cause the vehicle to steer to align the hitch ball with the coupler.

According to another aspect of the present invention, a method for assisting a vehicle in hitching with a trailer includes identifying a trailer coupler within a specified area relative to the vehicle. The specified area is defined between a maximum distance and a minimum distance from a rear of the vehicle and within left and right lateral vehicle control limits. The method further includes outputting a steering signal to the vehicle to cause the vehicle to steer to align a hitch ball of the vehicle with the coupler.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
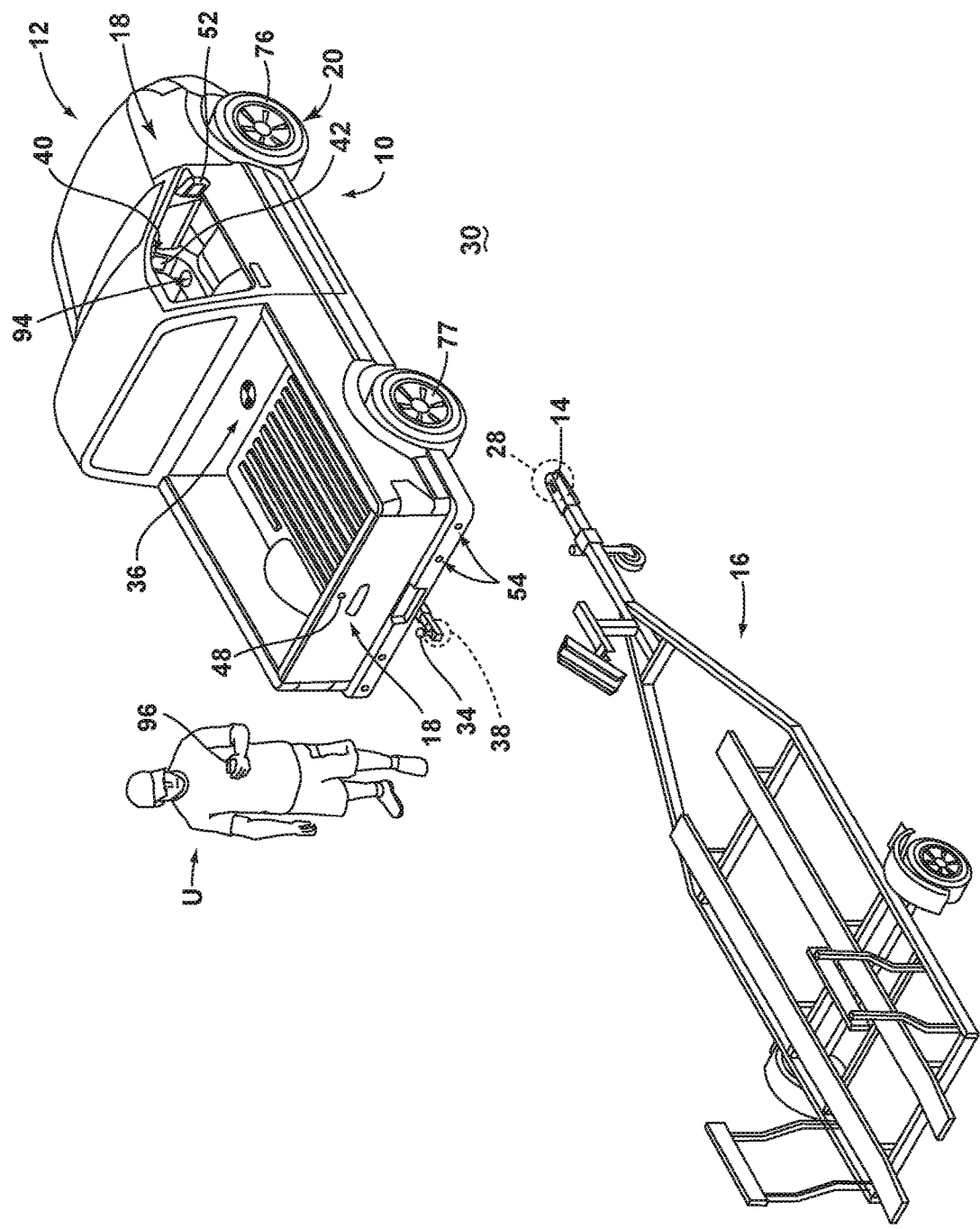
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. In particular, hitch assistance system 10 includes a controller 26 identifying a trailer coupler 14 within a specified area 110 relative to the vehicle 12. The specified area 110 is defined between a maximum distance R1 and a minimum distance R2 from a rear 18 of the vehicle 12 and within left and right lateral vehicle control limits L1, L2. The controller 26 further outputs a steering signal to the vehicle 12 to cause the vehicle 12 to steer to align a hitch ball 34 of the vehicle 12 with the coupler 14.

Figure 2:
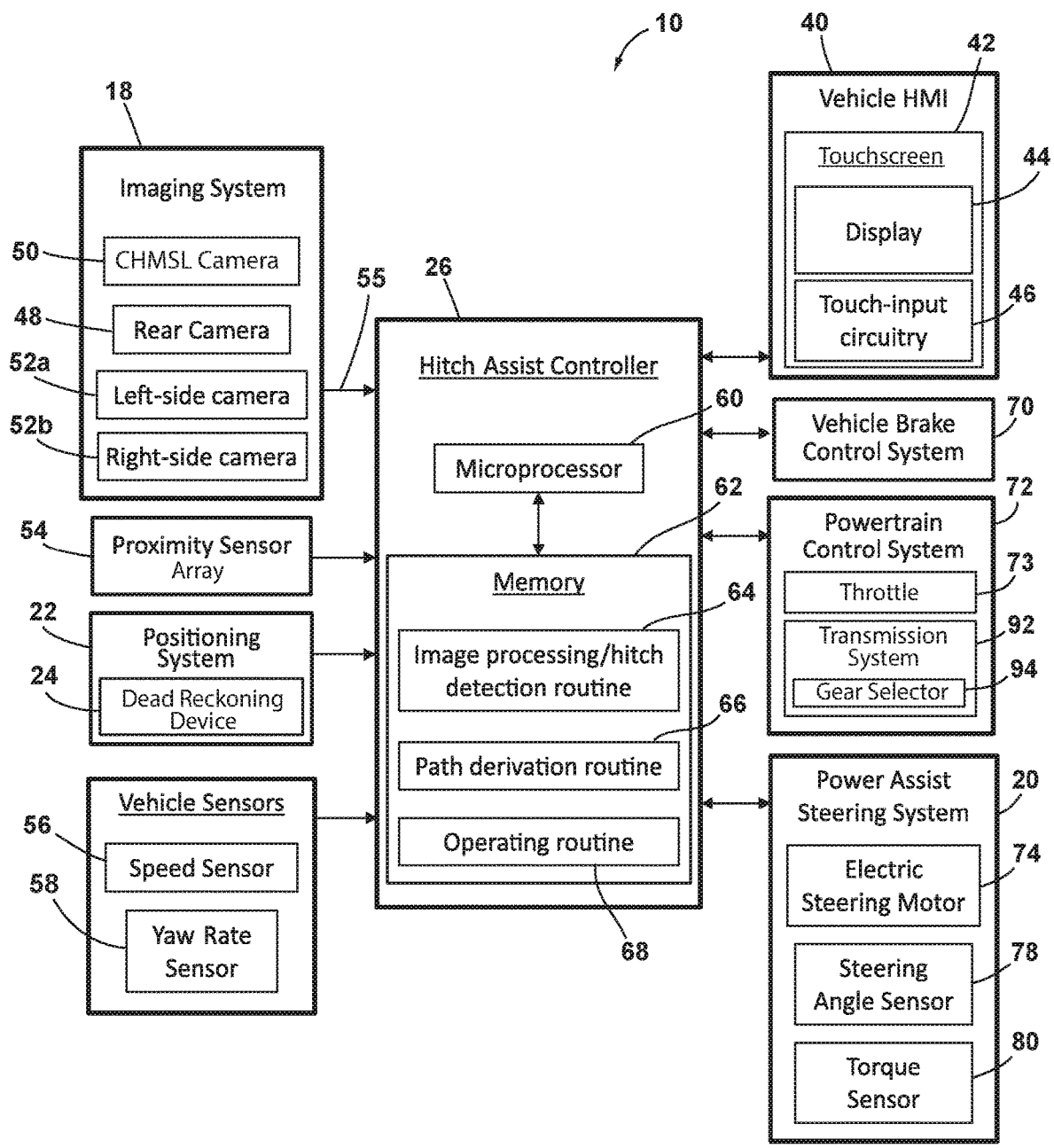
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle S. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle S. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
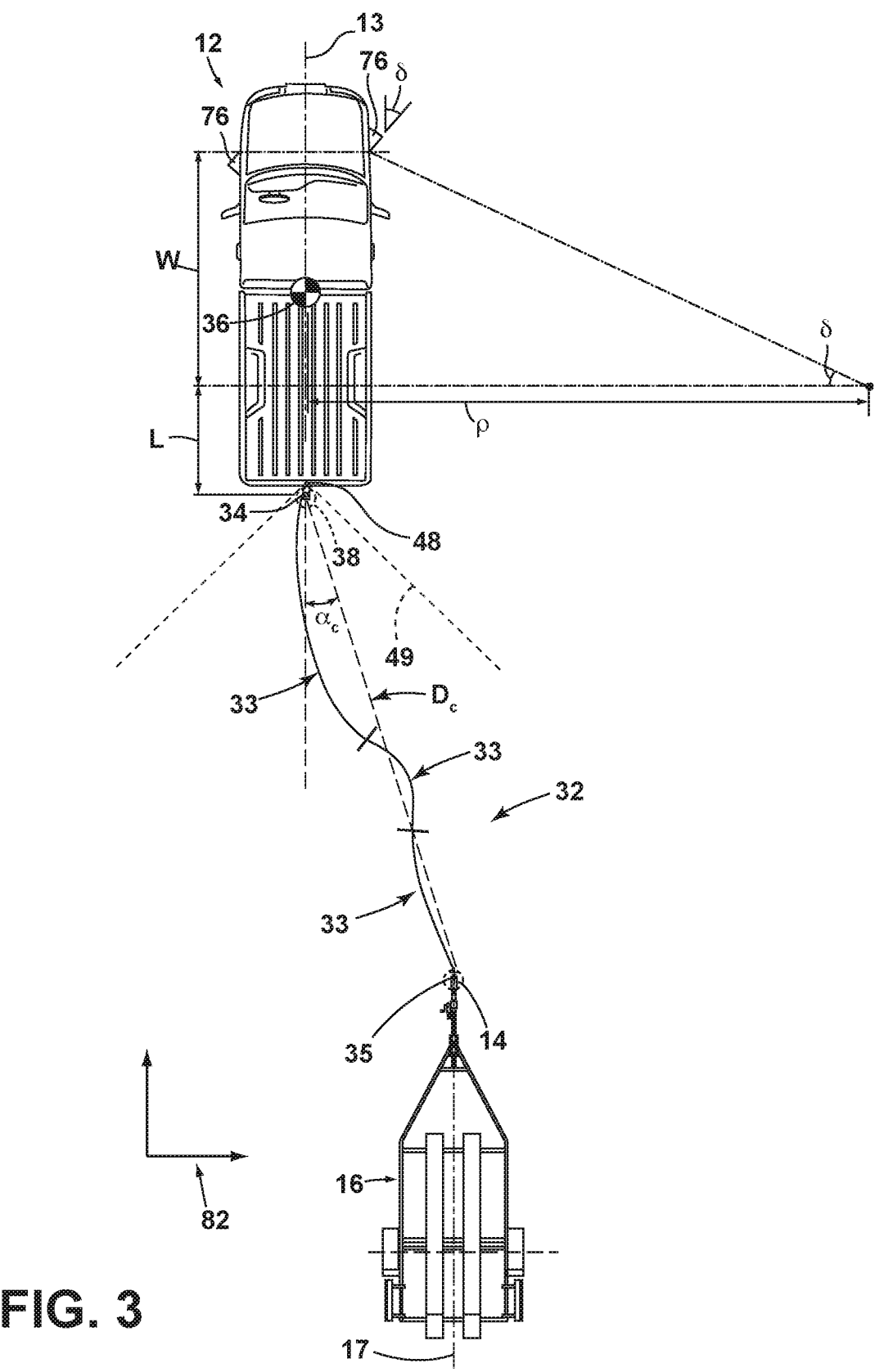
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle S. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γ&, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 44 with circuitry 46 to receive an input corresponding with a location over display 44. Other forms of input, including one or more joysticks, digital input pads, or the like can be used in place or in addition to touchscreen 44. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CMHSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CMHSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of an number of different types, sizes or configurations of trailers compatible with system 10, or trailers in general. Controller 26 can seek confirmation from the user that the identification of the trailer 16 is accurate and is the correct trailer for which to complete an automated hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the location 28 of coupler 14 can be determined based on the marker location. Additionally or alternatively, controller 26 may seek confirmation of the determined coupler 14, via a prompt on touchscreen 44. If the coupler 14 determination is not confirmed, further image processing may be provided, or user-adjustment of the position 28 of coupler 14 may be facilitated, either using touchscreen 44 or another input to allow the user to move the depicted position 28 of coupler 14 on touchscreen 44, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 12 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 44, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between a line connecting hitch ball 34 and coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without collision between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Figure 5:
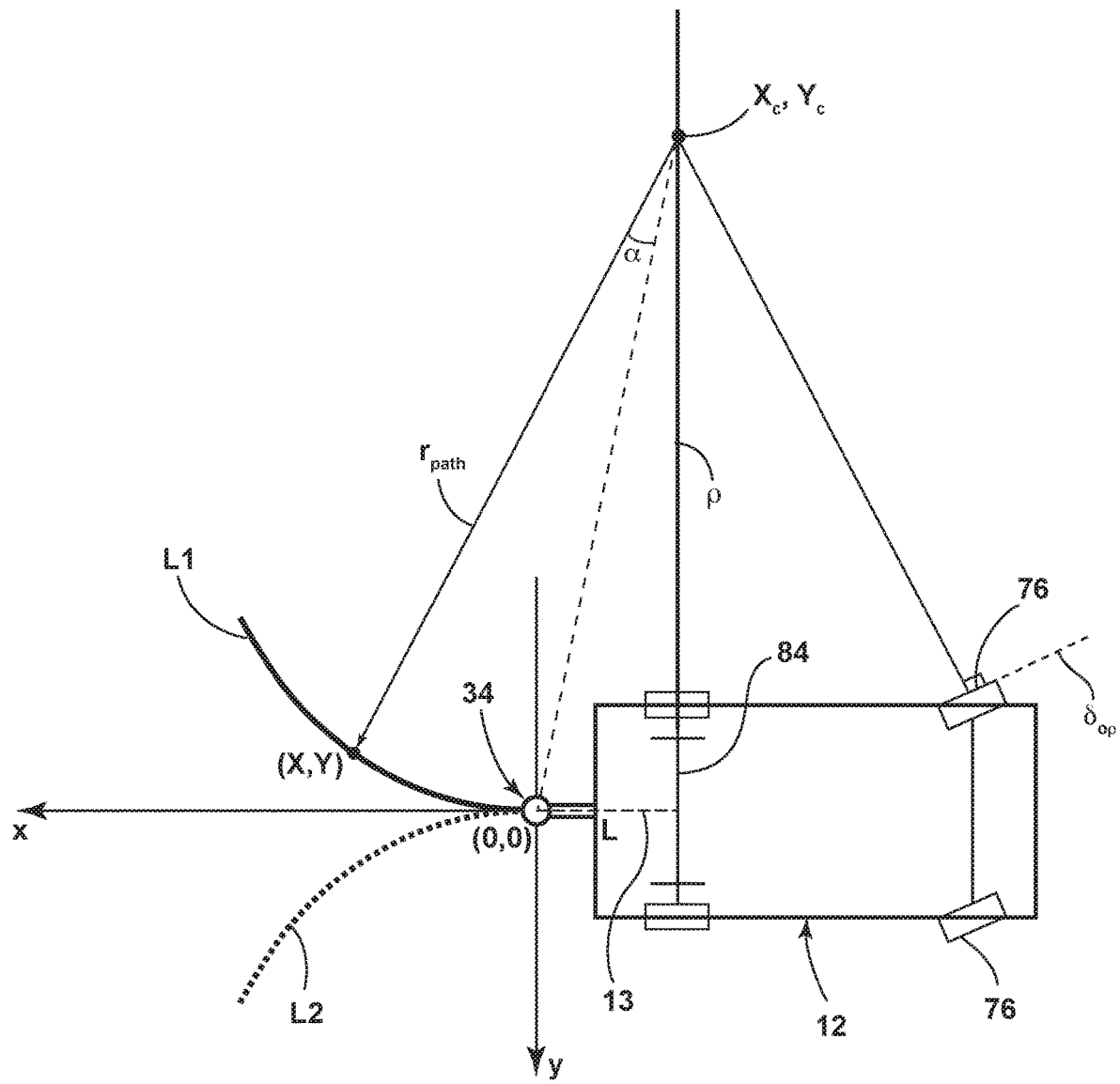
FIG. 5 is an overhead schematic view depicting the geometry for determining lateral limits of the target area.

Continuing with reference to FIG. 5 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta}, \tag{1}$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \tag{2}$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement Δx of coupler 14 in a driving direction away from axle 84 by determining the movement of coupler 14 in the vertical direction Δy that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein.

As discussed above, once the desired path 32, including endpoint 35, has been determined using either of the offset determination schemes discussed above, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from smartphone 96, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

In this manner, the initial determination of the position 28 of trailer 16 to an accepted level of accuracy is needed for execution of the path derivation routine 66 and subsequent automated backing of vehicle 12 along the path 32. Various characteristics or limitations of system 10 may impact the ability of system 10 to identify the trailer 16 (as well as the coupler 14, whenever such identification is carried out) in the data 55 received from imaging system 18 under certain conditions or in certain settings. Still further, various vehicle 12 or other system 10 characteristics may impact the ability of system 10 to navigate to reach a trailer 16 that is, nevertheless, present within the image data 55. Depending on the particular configuration of system 10, such characteristics can be partially driven by the imaging system 18 used by system 10. The imaging system 18 may be limited in its ability to identify a trailer 16 and/or coupler 14 within the entire field of the image data 55. In an example, it may be assumed, at least for simplicity of illustration, that system 10 only uses rear camera 48 for trailer 16 and coupler 14 detection, with rear camera 48 having a field of view 49 that is included in its entirety in the "total field" of the image data 55 (notably, if additional cameras 50,52a,52b are used, the total field of the image data 55 would include the entire assembled image from all such utilized cameras). The imaging system 18 limitations may limit system 10 functionality to only a limited distance between trailer coupler 14 and the vehicle 12, as different factors may limit the ability of controller 26 in identifying a trailer 16 or its coupler 14 when the trailer 16 and vehicle 12 are too close together or too far apart. For example, as illustrated in FIG. 4, the resolution of the various cameras 48,50,52a,52b in imaging system 18 may impact the ability to identify any trailers 16 or couplers 14 beyond a maximum distance R1 from vehicle 12 with the particular value of R1 being influenced by ambient conditions, including available light and/or weather conditions (e.g., rain or snow).

Figure 4:
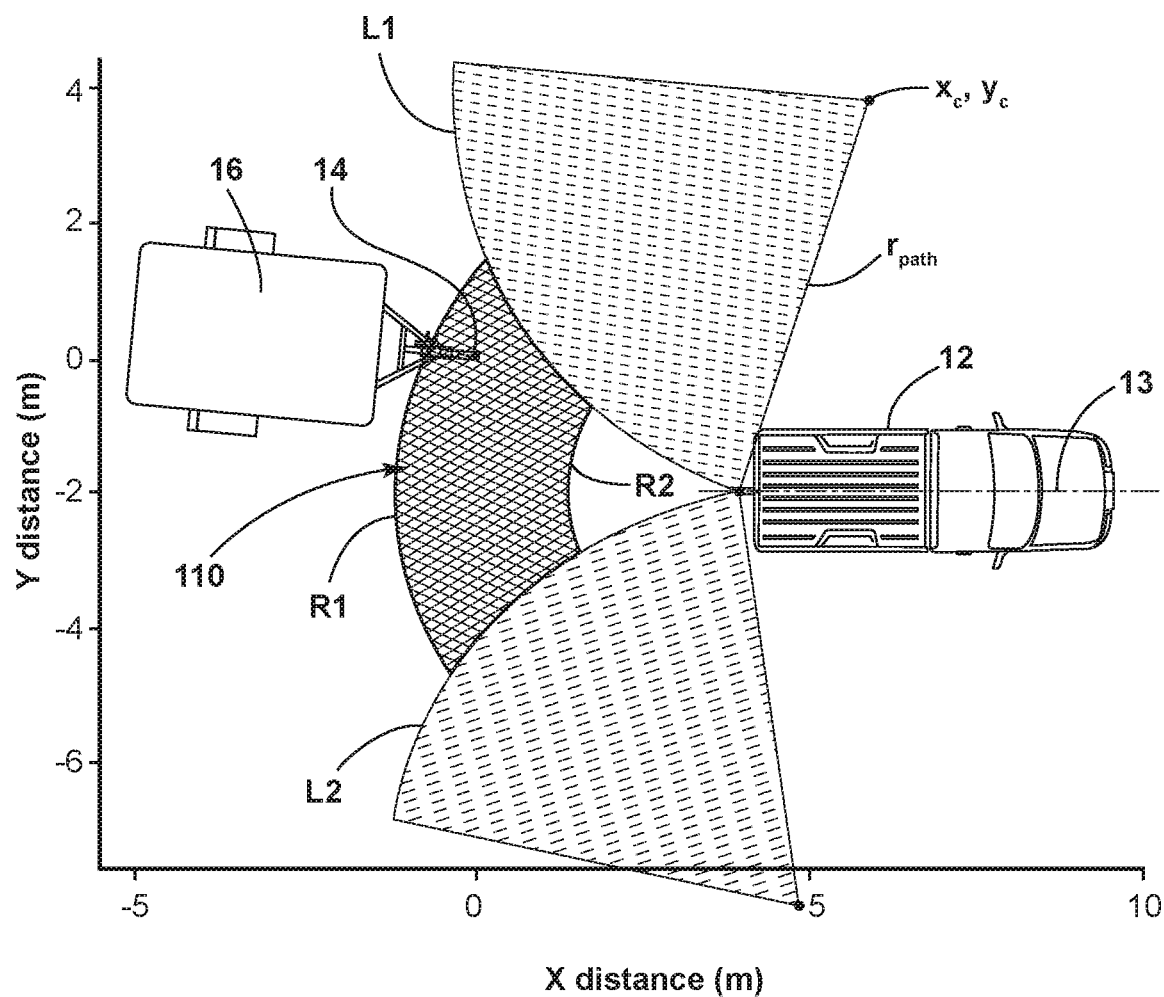
FIG. 4 is a schematic depiction of a target zone for trailer identification based on alignment with a vehicle including a system according to FIG. 2.

Additionally, a minimum distance R2, also illustrated in FIG. 4, for trailer 16 or coupler 14 detection may be realized because certain implementations of system 10 may rely on dynamic readings (such as of the ground surface behind vehicle 12 or other features visible around coupler 14) to calibrate system 10 and or to track vehicle 12 speed in reversing and to track the position of coupler 14 during system 10 operation. In particular, in the above example where only rear camera 48 is used by system 10, it may be necessary to detect motion within the field of view 49 to identify distance to the coupler 14 and to provide accurate tracking and boundary resolution (an aspect of image processing routine 64). Further, the operating routine 68 may include a longitudinal control algorithm that relies on precise control of the vehicle 12, and a minimum amount of travel distance corresponding with R2 in an example, is required to calibrate certain braking and powertrain variables to achieve such vehicle control. Still further, if a trailer 16 is too close to vehicle 12, various features of the trailer 16 may appear as trailers themselves to the image processing routine 64, meaning that to assist system 10, the trailer 16 should be beyond the minimum distance R2 such that a proportionality of features, including of trailer 16 itself as well as of trailer 16 relative to the total field of image data 55, is optimized for image processing routine 64 functionality.

As also shown in FIG. 4, other limitations of system 10 functionality may add constraints to the target zone of operation. In this respect, system 10 may not be capable of maneuvering vehicle 12 towards all locations in an initial view of the rear camera 48 (i.e., during trailer 16 or coupler 14 identification). In particular, system 10 may be restricted in its ability to reach a potential target position due, but not limited, to a lateral span that is a function of a distance range and the steering angle δ limitations of vehicle 12. In one aspect, the maximum steering angle $\delta_{max}$ of the vehicle 12 determines the lateral range, as a function of distance $D_c$ to coupler 14, as discussed further below. In general, an implementation of system 10 may restrict maneuvering of vehicle 12 to a single reversing motion that, while potentially including steering in both the left and right directions, does not incorporate forward driving of vehicle 12 between successive instances of reverse driving, for example. In this manner, the maximum lateral distance that can be traversed by vehicle 12 in an automated hitching operation is limited by the maximum steering angle $\delta_{max}$. As the vehicle 12 travels laterally by turning the steered wheels 76 and reversing, the lateral vehicle control limits L1,L2 of system operability 10 are determined as, essentially, a theoretical hitch ball 34 path extending rearward of the vehicle corresponding with steering of vehicle 12 at a particular steering angle δ under reversing of vehicle 12 to either side. In this manner, the lateral vehicle control limits L1,L2 of system 10 may extend outwardly from vehicle 12, with increasing distance away from vehicle 12 and may be characterized or determined based on left and right steering path limits of vehicle 12.

In a further aspect, the lateral vehicle control limits L1,L2 may be limited by an operating angle $\delta_{op}$ that is lower than maximum steering angle $\delta_{max}$. The difference between the operating angle $\delta_{op}$ and the maximum steering angle my vary based on criteria that can be selected to optimize or improve the performance of system 10, to address various constraints on the operation of system 10, or to increase the predictability or reliable performance of system 10. In one aspect, it may simply be desired for system 10 to be prevented from calling for a maximum steering angle $\delta_{max}$ to allow system 10 to manage variations that may arise in the actual maximum angle $\delta_{max}$ reachable by the steering system 20 under varying conditions, to prevent wear on steering system 20, or the like. In another example, the operating angle $\delta_{op}$ may be determined based on predetermined constraints for allowable swing of the front end of vehicle 12 that occurs when reversing vehicle 12 with the steered wheels 76 turned. As would be understood, the swingout distance for a vehicle 12 is dependent on the steering angle δ and the wheelbase W (as well as the front overhang distance between the front axle and the front of the vehicle 12), such that the maximum swingout resulting from reversing vehicle 12 can be limited by setting the operating angle $\delta_{op}$ appropriately. In one aspect, the operating angle $\delta_{op}$ can be set to limit the front-end swingout to 1 meter or less, for example, given the dimensions and geometry of the particular vehicle 12. In this manner, the lateral vehicle control limits L1,L2 of system 10 functionality may be further limited.

Because of these limitations, the present system 10 may be configured to only function with trailers 16 and associated couplers 14 positioned inside the specified area 110 relative to the vehicle 12, as shown in FIG. 4. The target area 110 may be determined by the factors listed above, and, potentially, any additional factors that affect the system 10 capability. To ensure such positioning of vehicle 12 relative to trailer 16, system 10 can be generally configured to direct the user to position vehicle 12 relative to trailer 16 such that trailer 16 (or coupler 14) is within such a target area 110 of the field of view of the utilized cameras, such as field of view 49 of rear camera 48, and the corresponding image data 55. As discussed above, the limitations of camera 48 and the requirements of image processing routine 64 and operating routine 68 can establish the maximum distance R1 and the minimum distance R2 from the rear of vehicle 12 for coupler 14 identification, which can establish the bounds of the specified area 110 with general respect to the longitudinal axis 13 of vehicle 12. In the illustrated example, the maximum distance R1 and the minimum distance R2 can be measured from the hitch ball 34 (or alternatively the rear camera 48, which may be positioned adjacent hitch ball 34, albeit at a different height) at a consistent distance therefrom such that R1 and R2 are radially spaced about the hitch ball 34 (or rear camera 48).

As shown in FIGS. 4 and 5, the lateral limits L1, L2 can extend rearward from hitch ball 34 along arced paths based on the steering characteristics of vehicle 12, including the steering limit $\delta_{max}$ of steering system 20 and other limitations or performance parameters. In particular, the performance of system 10 in controlling vehicle 12 and/or providing a generally-acceptable path 32 may be improved, as discussed above, by configuring path derivation routine 66 to maintain the steering angle δ below the maximum $\delta_{max}$ by a predetermined amount or at the otherwise established operating angle $\delta_{op}$. In one example, the operating angle $\delta_{op}$ may be less than the maximum steering angle $\delta_{max}$ by a preset or adjustable offset, which may be a set angle (e.g., about 3° to about 10°) or by a preset or adjustable percentage based proportion (e.g., about 5% to about 25%). In other examples, discussed above, the operating angle $\delta_{op}$ may be based on specific characteristics of vehicle 12 based on other set or adjustable parameters. As shown in FIG. 5, the projected lateral limits L1,L2 can each be a single arc-shaped segment extending from the hitch ball 34 in a direction toward the coupler 14. In one aspect, the theoretical radius $r_{path}$ of the arc-shaped segment can be determined as follows:

$$r_{path} = \sqrt{\rho^2 + L^2}, \quad (3)$$

where:
ρ is the radius from the longitudinal axis 13 of vehicle 12 extending collinear with the rear axle 84 of vehicle 12 and is defined by the Equation (1), above where $\delta = \delta_{op}$; and L represents the distance between the center of the rear axle and the hitch ball 34, coordinate (0,0).

In this manner, the arced path of the lateral limits L1,L2 may be mirror images of each other about the longitudinal axis 13 of vehicle 12 and may be defined by the following equations, where x and y are the coordinates of any points on lateral limit L1:

$$x = -x_c \cos(-\alpha) + y_c \sin(-\alpha) + x_c \quad (4)$$

$$y = -x_c \sin(-\alpha) - y_c \cos(-\alpha) + y_c \quad (5)$$

where:
$x_c$, $y_c$ is a coordinate representing the turn center for a given operating angle $\delta_{op}$; and α represents the angle extending from the hitch ball to an upper limit that can be set to define the arced paths of L1 and L2 to extend to a distance beyond R1, for example.

The turn center for a left turn can be described as $x_c=-L$ and $y_c=-\rho$ and can be described as $x_c=L$ and $y_c=\rho$ for a right turn. From the determined operating angle $\delta_{op}$, system 10 can determine the turn center and can use the above equations to determine the lateral limits L1,L2 within a frame of reference centered at hitch ball 34 and its x-axis aligned with the longitudinal axis 13 of vehicle 12. Notably, the length L, as well as the wheelbase W, which affect the positioning of the turn center for the determined steering angle are configurable based on the various vehicle parameters and can be stored in memory 62 and the upper limit of angle α can also be adjusted based on the parameters that influence R1, for example, such that the lateral limits L1,L2 are determined for an appropriate distance to intersect or cross the longitudinal limit R1. As shown in FIG. 4, the target zone 110 can, thusly, be defined as the area bounded by the limits R1, R2, L1, and L2.

Figure 6:
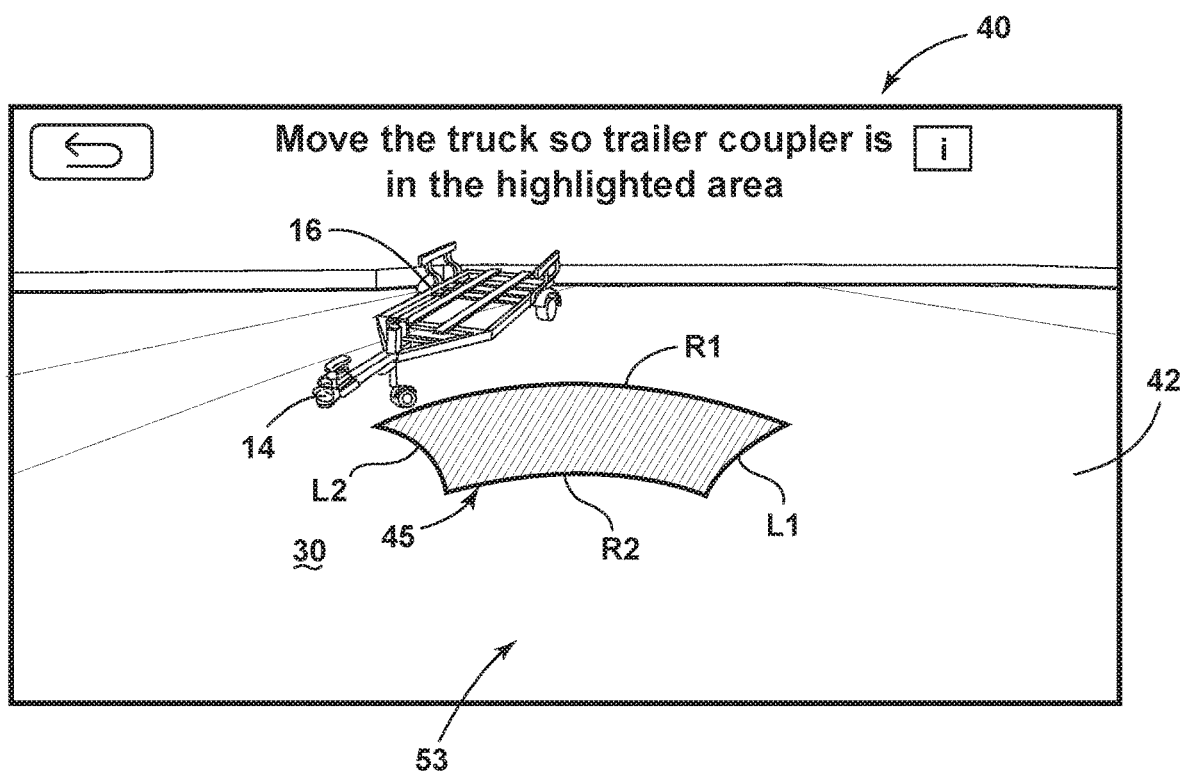
FIG. 6 is a depiction of an image received from a vehicle camera during an alignment sequence step with a target image overlaid thereon.

As shown in FIG. 6, system 10 can communicate the positioning of coupler 14 relative to vehicle 12 by way of presenting target area 110 as a graphical overlay on a real-time video image 53 of the image data 55 from one or more of the cameras 48,50,52a,52b in imaging system 18 presented on screen 44. The target area 110 depiction may be derived and/or presented on screen 44 according to various characteristics of system 10 described above and may balance these characteristics and system requirements to provide widely useable functionality of system 10, overall. In this manner, the target area 110, as determined above can be positioned within the image 53 in a location that is determined to correspond with an actual location relative to vehicle 12 relative to the ground plane 30 on which vehicle 12 is positioned (and on which trailer 16 may be assumed to be present, regardless of actual ground characteristics) that is within the actual target area 110 for trailer 16 and coupler 14 detection and vehicle 12 navigation for alignment therewith.

The target area 110 may be graphically depicted as a graphic target 45 that may correspond with the actual target zone 110 for trailer 16 and coupler 14 positioning relative to vehicle 12, which may provide increased flexibility and greater understanding of the system 10 requirements for the user. As discussed above, the visibility requirements of the routines 64,66,68 may dictate that trailer 16 (or at least coupler 14) be positioned between a longitudinal range between limits R1 and R2 that correspond with distance from the vehicle 12, as shown in FIG. 4. As also shown in FIG. 6, the lateral range for the target zone extends between the lateral limits L1 and L2, which as discussed above extend outwardly from the hitch ball 34 along paths corresponding with operating angle $\delta_{op}$ in both the left and right directions. In this manner, the target zone 110 is an area along the ground plane 30 that is within both the longitudinal range and the lateral range and is, therefore, an area bounded by respective portions of the longitudinal limits R1,R2 and the lateral limits L1,L2.

As shown in FIG. 6, the target 45 can be presented on screen 44 as an overlay on the video image 53 displayed using the image data 55 that approximates the target zone 110 on the image 53. In this manner, the respective portions of the ranges R1,R2,L1,L2 bounding the target zone 110 can be graphically represented on screen 44 in a manner that correlates the target zone 110 on the actual ground plane 30 with the view on the screen 44 based on the properties of camera 48, for example, and the position thereof to arrive at a perspective projection of the target zone that at least reasonably appears as an area of the ground visible on the screen 44. In this manner, the user may position vehicle 12 such that the subject trailer is within the target 45 corresponding with the target zone 110. In an example, once such positioning is achieved and system 10 detects at least trailer 16 within the target zone 110 or aligned with target 45, the an indication can be given to the user and system 10 can either seek confirmation of the identified coupler 14 or proceed with the hitching operation, as described below.

Figure 7:
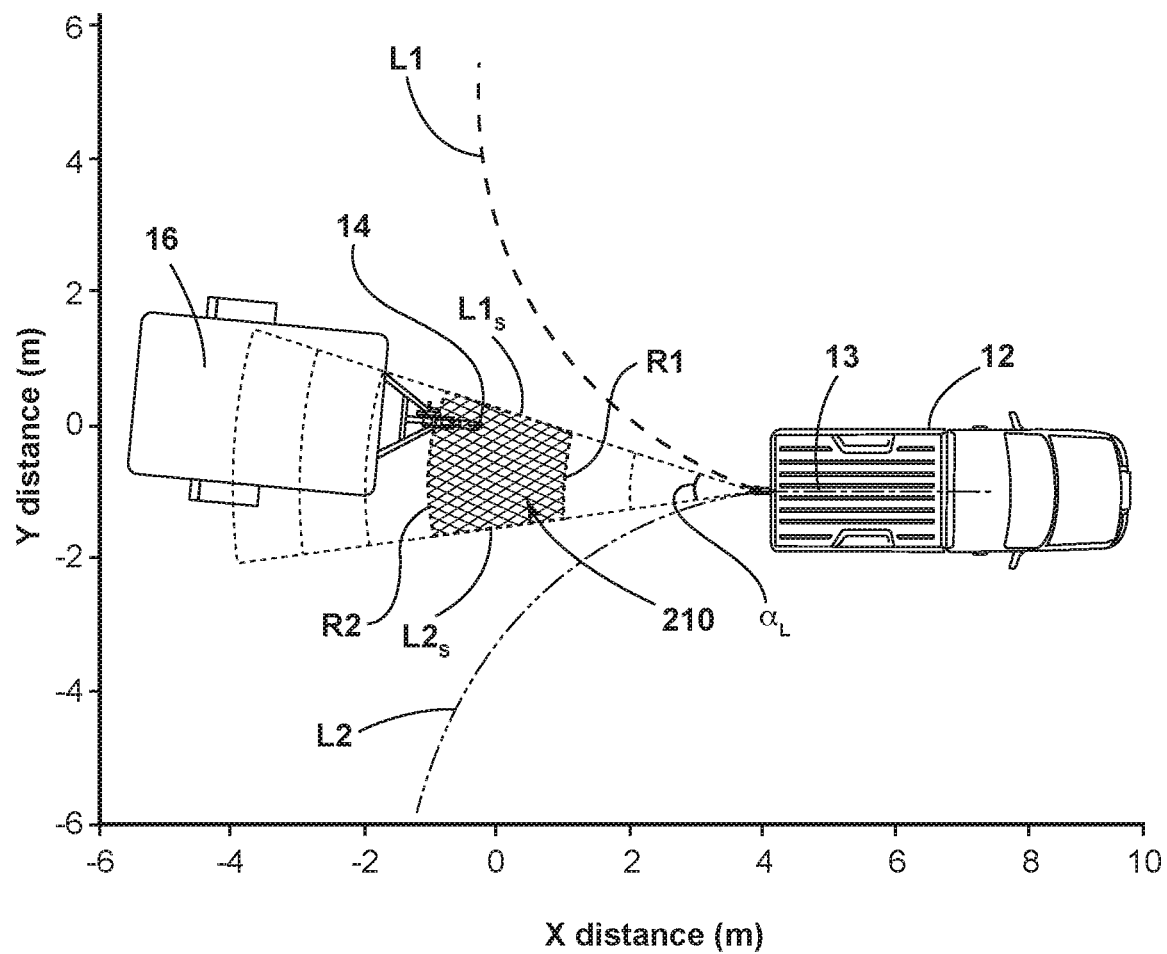
FIG. 7 is a schematic depiction of an alternative target zone for trailer identification based on alignment with a vehicle including a system according to FIG. 2.
Figure 8:
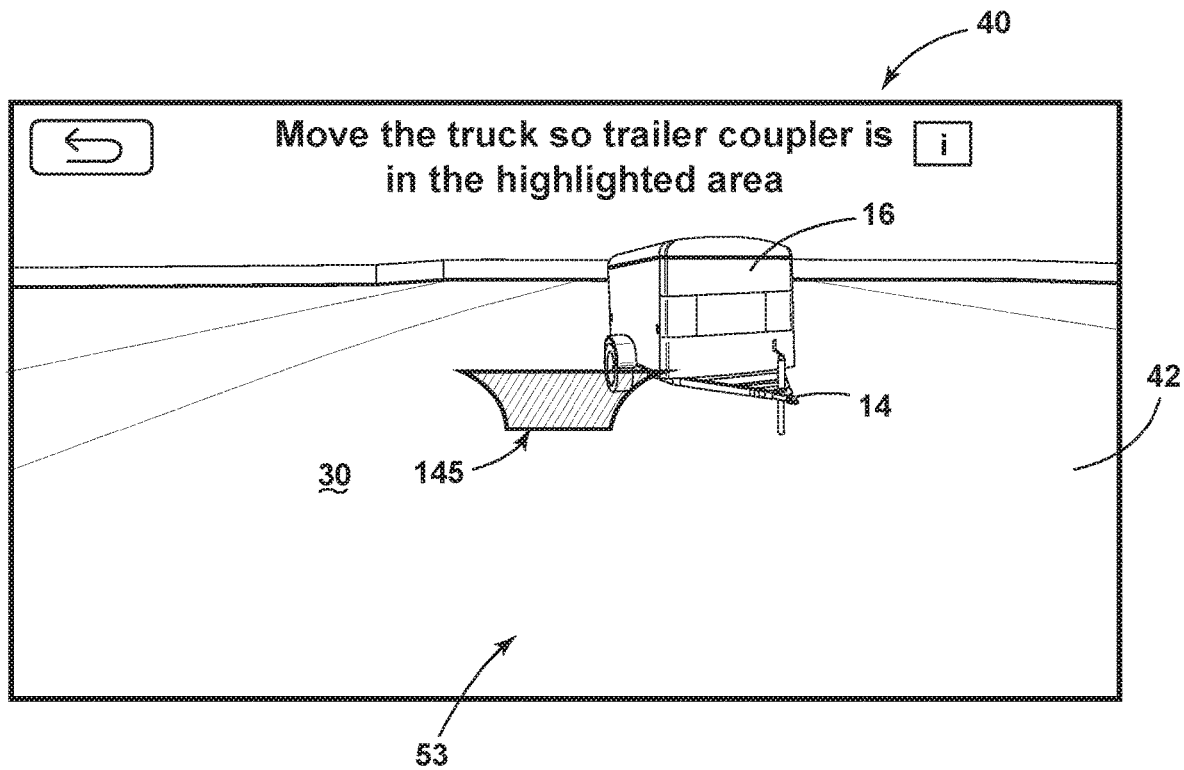
FIG. 8 is a depiction of an image received from a vehicle camera during an alignment sequence step with an alternative target overlaid thereon.

In the example of FIGS. 7 and 8, the target area 210 can be further defined within the area bounded by R1, R2, L1$_s$, and L2$_s$, as discussed above. In particular, target area 210 can be a further subset of the larger area 110 such that the target area 210 can be an area that can be reached along a path 32 from hitch ball 34 that is defined by a straight line. Accordingly, the displayed target 145 may not directly correspond with the complete area within which detection of and navigation to coupler 14 is possible, but may rather be an area that can be reached within a restricted variation of operating routine 68 and may be further modified in shape compared with target area 210 to communicate the intent of target 145 to the user and/or to make target 145 easier for the user to understand. In this manner the lateral limits L1$s$ and L2$s$ may correspond with inner left and right straight paths that be more narrowly spaced than those that define the target area 110 discussed above. In this aspect, the target area 210 may still be within a maximum and minimum distance R1, R2 from vehicle 12 that may be defined in a similar manner to that which is discussed above. In particular, the lateral limits L1$s$ and L2$s$ can be defined by an angle $\alpha_L$ that is centered about the longitudinal axis 13 of vehicle 12 and is defined by the equation:

$$\alpha_L = 2 \cdot \tan^{-1} \frac{W}{\rho_{min}}. \tag{6}$$

Figure 9:
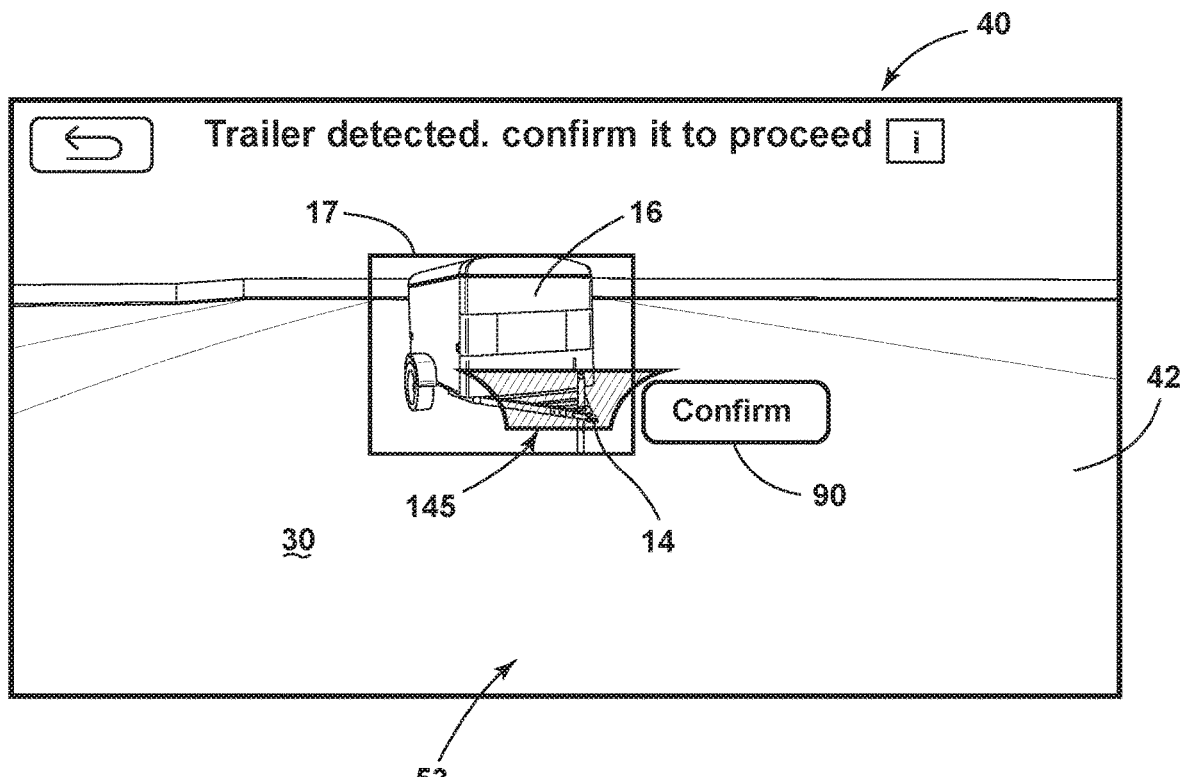
FIG. 9 is a further depiction of a subsequent image received from a vehicle camera during a subsequent alignment sequence step with the target and additional information overlaid thereon.
Figure 10:
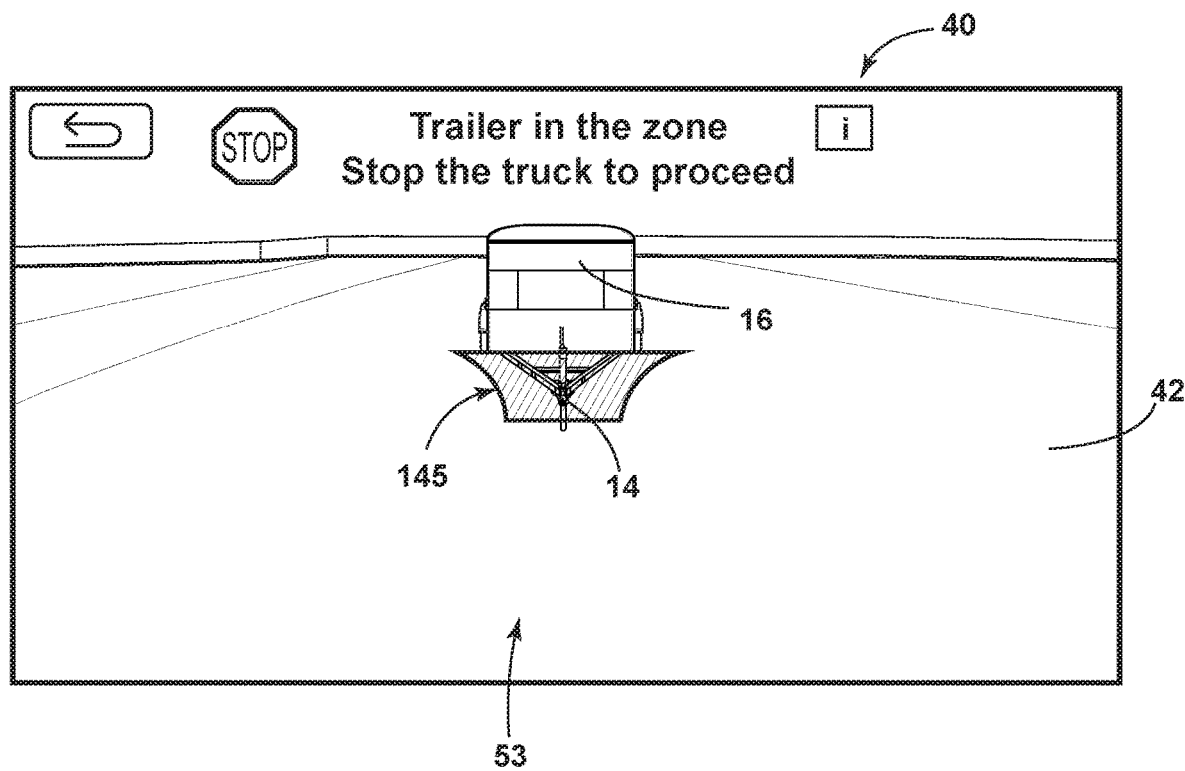
FIG. 10 is an alternative further depiction of a subsequent image received from a vehicle camera during an alternative subsequent alignment sequence step with the target and additional information overlaid thereon.
Figure 11:
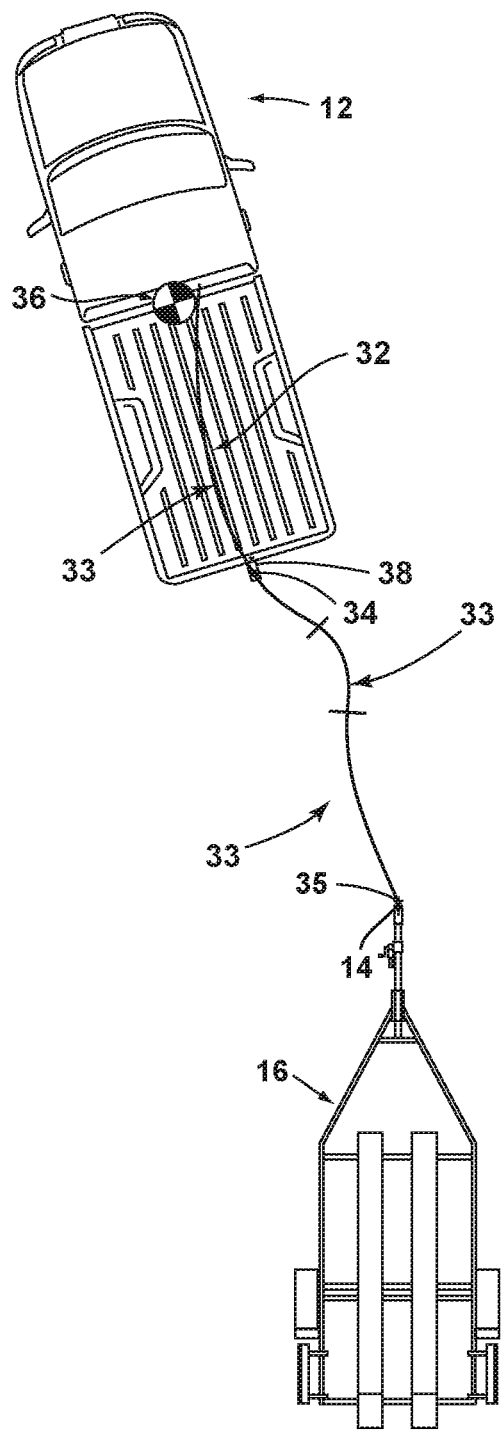
FIG. 11 is an overhead schematic view of the vehicle during a subsequent step of the alignment sequence with the trailer.

As shown in FIG. 8, the target 145 used to represent target area 210, may be presented on screen 44 in a manner similar to that which is discussed above with respect to FIG. 6 with target 145 being generally smaller than target 45 and, as discussed above, presenting a varied shape from the actual target area 210, while generally corresponding in size and location. It is noted that the actual depictions of target 145 may vary from what is shown in FIG. 8 and, in one example, may more closely correspond with target area 210 in a shape generally similar to that which is shown in FIG. 6, but narrowed in a similar manner to the target area 210 compared to target area 110. As shown in FIG. 9, in one operating scheme, when initiated, system 10 can automatically attempt to identify a trailer 16 within the area of target 45 while prompting the driver to position vehicle 12 such that the coupler 14 and/or trailer 16 is within the area of target 145. When a trailer 16, including its coupler 14, are detected (which would generally coincide with positioning thereof within the area of target 145, system 10 can indicate such an identification, as discussed above, by highlighting the trailer with box 17 (FIG. 9), while instructing the driver to confirm (by pressing button 90, for example) to confirm that the desired trailer 16 has been identified. At which point, vehicle 12, according to various potential interactive schemes, can acquire control of vehicle 12 from the user and can control vehicle 12 in aligning hitch ball 34 with coupler 14 for hitching of vehicle 12 with the trailer 16. Alternatively, as shown in FIG. 10, system 10 can alert the user when proper alignment of coupler 14 within the target area 210 has been achieved and instruct the user to stop the vehicle to begin the hitching operation. Similar schemes can be used with the target 45 corresponding with target area 110, as discussed above.

Figure 12:
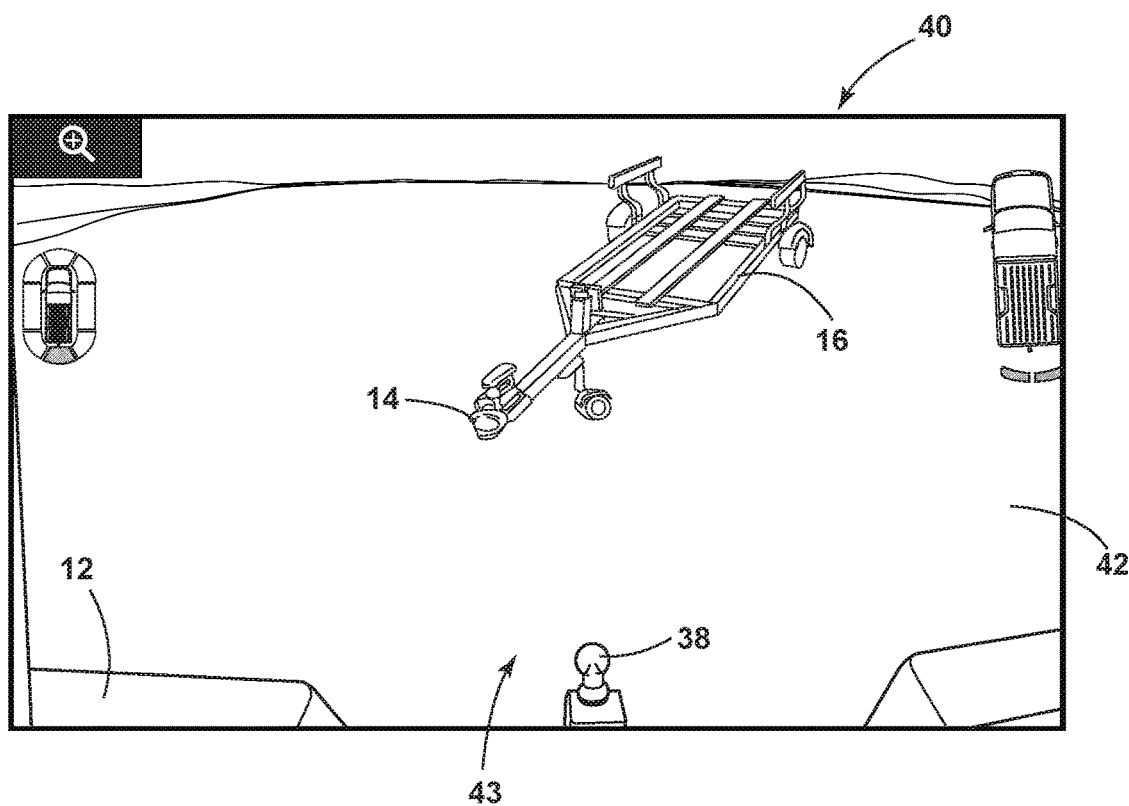
FIG. 12 is a depiction of an image received from a vehicle camera during the alignment sequence step of FIG. 11.
Figure 13:
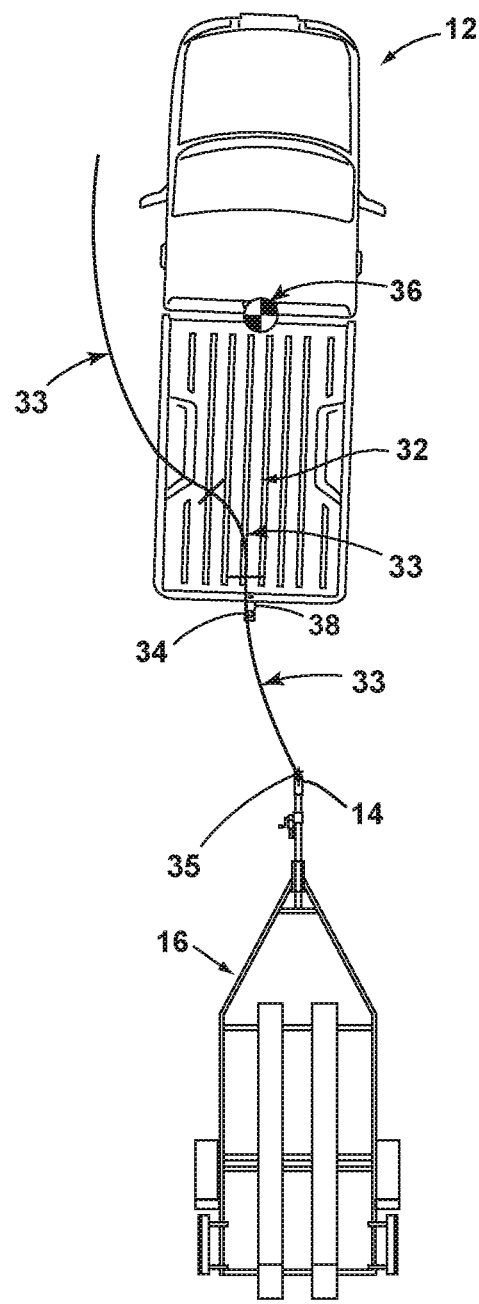
FIG. 13 is an overhead schematic view of the vehicle during a subsequent step of the alignment sequence with the trailer.
Figure 14:
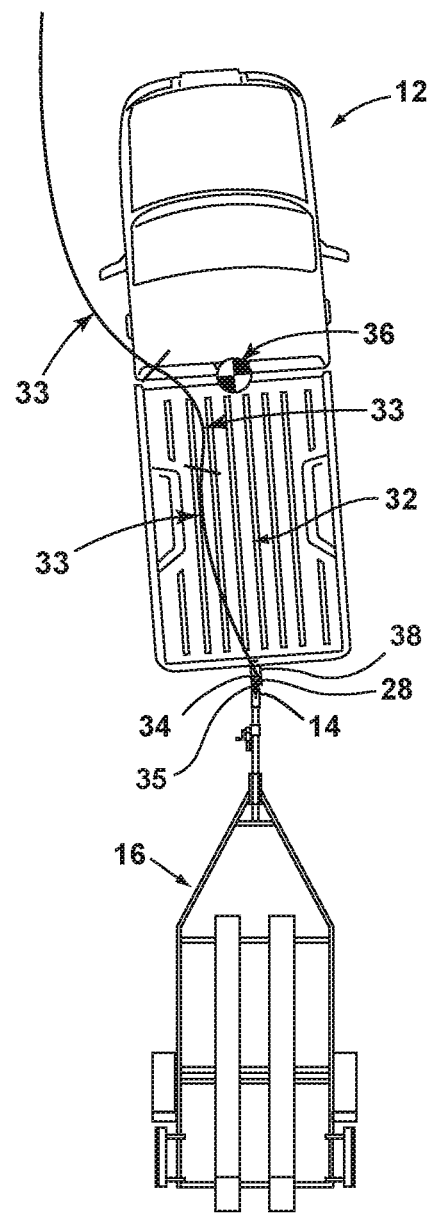
FIG. 14 is an overhead schematic view of the vehicle during a subsequent step of the alignment sequence with the trailer and showing the position of a hitch ball of the vehicle at an end of a derived alignment path.

Turning now to FIGS. 11-14, once the trailer 16 and coupler 14 have been identified, and system 10 determines the path 32 to align hitch ball 34 with the coupler 14, the operating routine 68 may continue to guide vehicle 12 until hitch ball 34 is in the desired position $38_d$ relative to coupler 14 for coupler 14 to engage with hitch ball 34 when coupler 14 is lowered into horizontal alignment therewith. In the example discussed above, image processing routine 64 continuously monitors the positioning $D_c$, $\alpha_c$ of coupler 14, constantly or once available, during execution of operating routine 68, including as coupler 14 comes into clearer view of rear camera 48, as shown in FIG. 12, with continued movement of vehicle 12 along path 32, as shown in FIG. 13. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data 55), including as vehicle moves closer to trailer 16, as shown in FIG. 13. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 38d thereof relative to the tracked position 28 of coupler 14, as discussed above and shown in FIG. 14.

Figure 15:
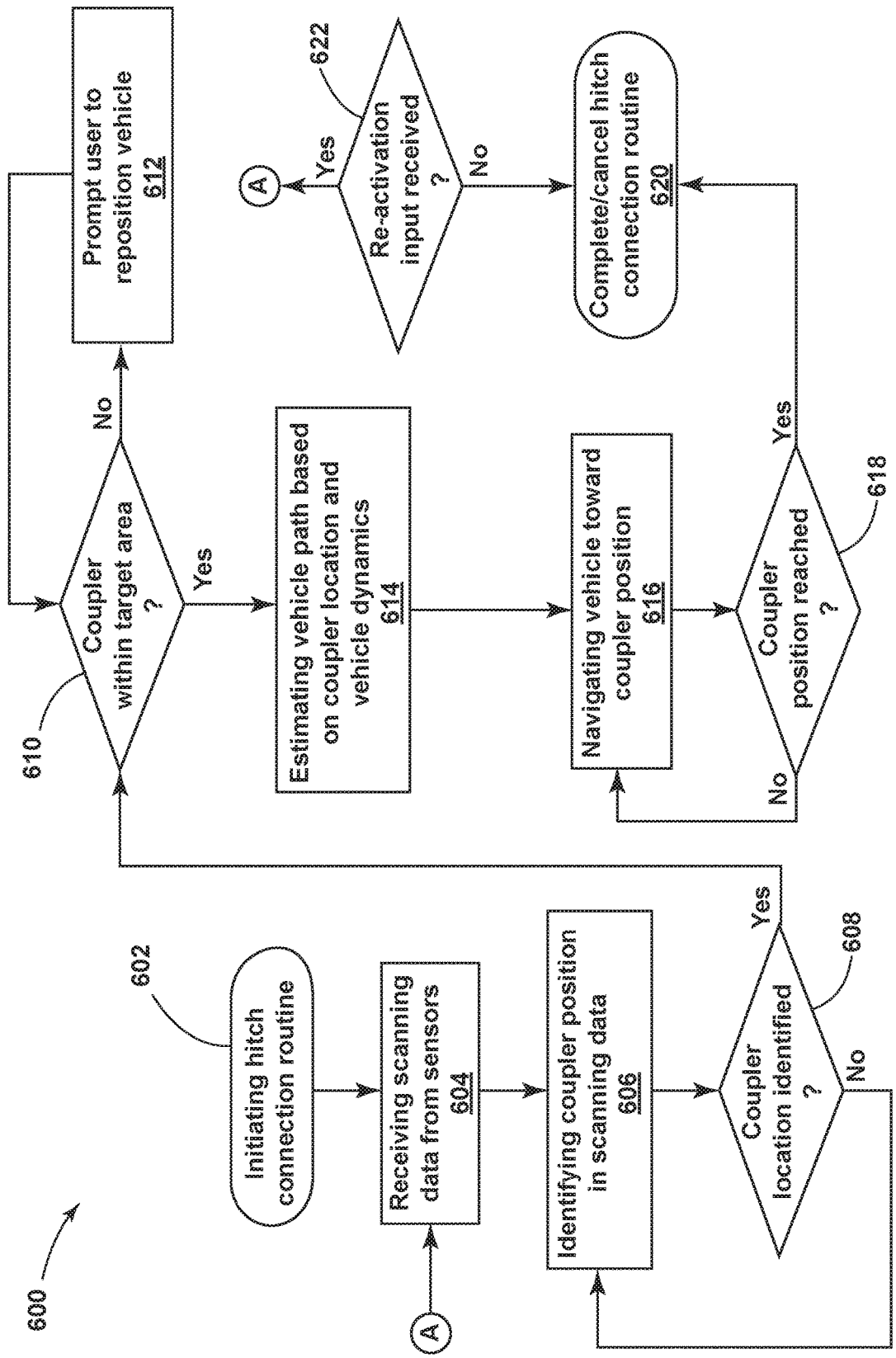
FIG. 15 is a flowchart depicting steps in the alignment sequence.

Turning now to FIG. 15, a flowchart showing steps in one operating scheme 600 for using hitch assist system 10 to align a vehicle hitch ball 34 with a trailer coupler 14 is shown. In particular, in step 602, the hitch assist system 10 is initiated. Once the hitch assist system 10 is initiated 602, controller 26 can use imaging system 18 to scan the viewable scene using any or all available cameras 48, 50, 52a, 52b (step 604). The scene scan (step 612) can be used to then identify 606 the trailer 16 and coupler 14, which may be confirmed by the user, which may proceed using target 45 on vehicle HMI 40, as discussed in any of the schemes discussed above.

If the coupler 14 can be identified (step 608), it can then be determined 610 if the coupler 14 is within the target area 110 (or 210). In one aspect, if no coupler can be identified, it can be assumed that the coupler 14 is outside of the target area 110 (or 210). If coupler 14 is not in the applicable target area 110 (or 210), system 10 can instruct 612 the user to reposition vehicle 12 accordingly, as discussed above. If coupler 14 is within the applicable target area 110 (or 210), system 10 can use the image data 55 to determine distance $D_c$, and offset angle $\alpha_c$ of coupler 14, as identified in step 606, including using image processing routine 64. The path derivation routine 66 can be used to determine the vehicle path 32 to align hitch ball 34 with coupler 14 in step 614. In this manner, the positioning $D_h$, $\alpha_h$ of coupler 14 is extracted from the image data 55 and used to place the coupler 14 within the stored data relating the image coordinates with the real-world coordinates of the area surrounding vehicle 12. In doing so, controller 26 uses path derivation routine 66 to determine path 32 to align hitch ball 34 with the predicted position 28 of coupler 14 to an engaging position over hitch ball 34, as described above with respect to FIGS. 11-14.

Once the path 32 has been derived, hitch assist system 10 can ask the user U to relinquish control of at least the steering wheel of vehicle 12 (and, optionally, the throttle 73 and brake, in the implementation of hitch assist system 10 described above wherein controller 26 assumes control of powertrain control system 72 and brake control system 70 during execution of operating routine 68). When it has been confirmed that user is not attempting to control steering system 20 (for example, using torque sensor 80, as discussed above), controller 26 begins to move vehicle 12 along the determined path 32 (step 616). Hitch assist system 10 then controls steering system 20 to maintain vehicle 12 along path 32 as either user U or controller 26 controls the velocity of vehicle 12 using powertrain control system 72 and braking control system 70. As discussed above, controller 26 or the user can control at least steering system 20, while tracking the position $D_c$, $\alpha_c$ of coupler 14 until vehicle 12 reaches endpoint 35 (step 618), wherein the vehicle 12 hitch ball 34 reaches the desired position $38_d$ for the desired alignment with coupler 14, at which point operating routine 68 can end (step 620), either by controlling brake system 70 to cause vehicle 12 to stop (which can be done progressively as vehicle 12 approaches such a point), or by issuing a command to the user to stop vehicle 12 (which can also be done progressively or by a countdown as vehicle 12 approaches the desired location) before deactivating hitch assist system 10. Vehicle 12 can then be driven normally with system 10 remains idle until a reactivation input 622 is received, at which point the above-described method restarts at the scanning step 604.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle hitching assistance system, comprising:
a controller:
identifying a coupler of a trailer positioned at a distance from the vehicle, the coupler being within a specified area relative to the vehicle, the specified area bounded by a maximum identification limit at a first distance from a rear of the vehicle and a minimum travel limit at a second distance from the rear of the vehicle that is less than the first distance corresponding with the maximum identification limit and within left and right lateral vehicle control limits; and
outputting a steering signal to the vehicle to cause the vehicle to steer to align a hitch ball of the vehicle with the coupler of the trailer during reversing of the vehicle toward the trailer.

2. The system of claim 1, wherein:
the specified area is to a rear of the vehicle; and
the left and right lateral vehicle control limits are arced paths extending from the hitch ball and are equal to left and right paths of the hitch ball in reversing of the vehicle at respective left and right steering angle limits of the vehicle.

3. The system of claim 1, wherein the left and right lateral vehicle control limits are less than left and right arced paths of the hitch ball in reversing of the vehicle at respective left and right steering angle limits by one of a predetermined proportion or a predetermined steering angle.

4. The system of claim 1, wherein the left and right lateral vehicle control limits are less than left and right steering path limits of the vehicle, determined by corresponding left and right steering angle limits of the vehicle, and are defined by two straight inner left and right paths that extend from the hitch ball at a predetermined angle to each other.

5. The system of claim 1, further including an imaging system mounted with and directed toward the rear of the vehicle, wherein:
the controller further acquires image data from the vehicle; and
the specified area is identified within the image data and is less than a total field of the image data.

6. The system of claim 5, wherein the maximum identification limit and minimum travel limit respectively correspond with limits of controller in identifying the trailer coupler within the image data.

7. The system of claim 6, wherein the maximum identification limit and minimum travel limit are further based on a resolution of the image data and a calibration requirement, respectively.

8. The system of claim 1, wherein the left and right lateral vehicle control limits are selected to maintain a swingout distance of the vehicle in steering to align the hitch ball of the vehicle with the coupler to less than a predetermined value.

9. The system of claim 8, wherein the left and right lateral vehicle control limits are defined by a path of the hitch ball for the vehicle reversing at a maximum steering angle selected based on a wheelbase of the vehicle to maintain the swingout distance of the vehicle in steering to align the hitch ball of the vehicle with the coupler to less than the predetermined value.

10. The system of claim 1, wherein the first distance and the second distance from the rear of the vehicle are measured radially from the hitch ball of the vehicle.

11. The system of claim 1, wherein:
the controller outputs the steering signal to a steering system included with the vehicle; and
the controller derives the steering signal based on at least a maximum steering angle of the steering system.

12. The system of claim 1, wherein the controller further outputs a video image displayable on a human-machine interface within the vehicle including:
an image to the rear of the vehicle; and
a graphic overlay of the specified area on the image data in a proportionally correlated manner between the image data and an assumed ground plane on which the vehicle is positioned.

13. A vehicle, comprising:
a hitch ball mounted on a rear of the vehicle;
a steering system; and
a controller:
identifying a coupler of a trailer positioned at a distance from the vehicle, the coupler being within a specified area bounded by a maximum identification limit at a first distance from the rear of the vehicle and a minimum travel limit at a second distance from the rear of the vehicle that is less than the first distance corresponding with the maximum identification limit and within left and right lateral vehicle control limits; and
outputting a steering signal to the steering system to cause the vehicle to steer to align the hitch ball with the coupler of the trailer during reversing of the vehicle toward the trailer.

14. The vehicle of claim 13, wherein:
the specified area is to a rear of the vehicle; and
the left and right lateral vehicle control limits are arced paths extending from the hitch ball and are equal to the left and right paths of the hitch ball in reversing of the vehicle at respective left and right steering angle limits of the vehicle.

15. The vehicle of claim 13, wherein:
the specified area is to a rear of the vehicle; and
the left and right lateral vehicle control limits are less than left and right arced paths of the hitch ball in reversing of the vehicle at steering angle limits by one of a predetermined proportion or a predetermined steering angle.

16. The vehicle of claim 13, wherein:
the specified area is to a rear of the vehicle; and
the left and right lateral vehicle control limits are less than left and right steering path limits of the vehicle, determined by corresponding left and right steering angle limits of the vehicle, and are defined by two straight inner left and right paths that extend from the hitch ball at a predetermined angle to each other.

17. The vehicle of claim 13, wherein the left and right lateral vehicle control limits are defined by a path of the hitch ball for the vehicle reversing at a maximum steering angle selected based on a wheelbase of the vehicle to maintain the swingout distance of the vehicle in steering to align the hitch ball of the vehicle with the coupler to less a predetermined value.

18. The vehicle of claim 13, wherein the maximum identification limit and the minimum travel limit from the rear of the vehicle are measured radially from the hitch ball of the vehicle.

19. The vehicle of claim 13, further including a human-machine interface within the vehicle, wherein:
the controller further outputs a video image to the human-machine interface, the video image including:
an image to the rear of the vehicle; and
a graphic overlay of the specified area on the image data in a proportionally correlated manner between the image data and an assumed ground plane on which the vehicle is positioned.

20. A method for assisting a vehicle in hitching with a trailer, comprising:
identifying a coupler of a trailer positioned at a distance from the vehicle, the coupler being within a specified area relative to the vehicle, the specified area being bounded by a maximum identification limit at a first distance from a rear of the vehicle and a minimum travel limit at a second distance from the rear of the vehicle that is less than the first distance corresponding with the maximum identification limit and within left and right lateral vehicle control limits; and
outputting a steering signal to the vehicle to cause the vehicle to steer to align a hitch ball of the vehicle with the coupler of the trailer during reversing of the vehicle toward the trailer.

* * * * *